United States Patent
Bermejo et al.

(10) Patent No.: US 12,505,368 B2
(45) Date of Patent: Dec. 23, 2025

(54) VARIATIONAL CONTINUOUS OPTIMIZATION AND APPLICATIONS

(71) Applicant: Multiverse Computing S.L., Donostia / San Sebastián (ES)

(72) Inventors: Pablo Bermejo, Donostia / San Sebastián (ES); Román Orús, Donostia / San Sebastián (ES)

(73) Assignee: Multiverse Computing S.L., Donostia / San Sebastián (ES)

( * ) Notice: Subject to any disclaimer, the term of this patent is extended or adjusted under 35 U.S.C. 154(b) by 600 days.

(21) Appl. No.: 18/075,106

(22) Filed: Dec. 5, 2022

(65) Prior Publication Data
US 2024/0185108 A1   Jun. 6, 2024

(51) Int. Cl.
*G06N 10/20* (2022.01)
(52) U.S. Cl.
CPC ................... *G06N 10/20* (2022.01)
(58) Field of Classification Search
CPC .............. G06N 10/20; G06N 10/00
See application file for complete search history.

(56) References Cited

U.S. PATENT DOCUMENTS 11,023,638 B2   6/2021 Parrish et al.
2020/0005186 A1*  1/2020 Romero ............. G06N 10/60
(Continued)

OTHER PUBLICATIONS

Liu et al., "Variational quantum circuits for quantum state tomography", Physical Review A, (Year: 2020).*
(Continued)

*Primary Examiner* — Omar F Fernandez Rivas
(74) *Attorney, Agent, or Firm* — 24IP Law Group USA, PLLC; Timothy DeWitt

(57) ABSTRACT

A method for optimization of multidimensional continuous functions using a quantum processor (50) is disclosed. The method comprises initializing (S400) quantum circuit parameters ($\vec{\omega}$) to set an initial guess $|\psi\rangle$ of a function $f(\vec{x})$, running (S410) a variational quantum circuit $U(\vec{\omega})$ over n qubits of the quantum processor (50), implementing (S420) a quantum state tomography function of the individual qubits to estimate qubit parameters [$\theta$, $\varphi$, r] of the function $f(\vec{x})$ for each qubit. The method further comprises estimating (S430) a vector of a continuous variable ($\vec{x}$) from the qubit parameters [$\theta$, $\varphi$, r], estimating (S440) a value of the function $f(\vec{x})$ and a gradient $\nabla f(\vec{x})$ of the function $f(\vec{x})$ at the point of the vector of the continuous variable ($\vec{x}$), updating (S450) the quantum circuit parameters ($\vec{\omega}$) and iterating (S460) the steps S410-S450 until optimization of the function $f(\vec{x})$.

15 Claims, 3 Drawing Sheets

(56) References Cited

U.S. PATENT DOCUMENTS

2020/0394547 A1 12/2020 Cao et al.
2022/0067567 A1* 3/2022 O'Brien .................. G06F 5/01

OTHER PUBLICATIONS

Zhang et al., "Variational quantum eigensolver with reduced circuit complexity", NPJ Quantum Information, (Year: 2022).*
Xue, et al., "Variational quantum process tomography of unitaries". Physical Review A, 105(3), 032427. (Year: 2021).*
Bermejo, Pablo & Orus, Roman. (2022). Variational Quantum Continuous Optimization: a Cornerstone of Quantum Mathematical Analysis. 10.48550/arXiv.2210.03136.

* cited by examiner

VARIATIONAL CONTINUOUS OPTIMIZATION AND APPLICATIONS

CROSS-REFERENCE TO RELATED APPLICATIONS

None

BACKGROUND OF THE INVENTION

Field of the Invention

The present invention relates to methods and systems for optimization of multidimensional continuous functions.

Brief Description of the Related Art

A quantum algorithm for continuous optimization can be used to compute arbitrary series expansions such as but not limited to Fourier (harmonic) decompositions. It is known that Fourier analysis allows implementation a variety of tasks related to function calculus and thus the quantum algorithm can be used in, for example, the evaluation of multidimensional definite integrals, and solving systems of differential equations. Complex function calculation can solve different technical problems in science and engineering using quantum computers in a more efficient way than traditional classical methods.

U.S. Pat. No. 11,023,638 B2 (QC WARE Corp.) teaches a hybrid quantum-classical optimization technique for optimizing circuit parameters of discrete variational quantum algorithms. In a first stage, analytical tomography fittings are performed for a local cluster of the circuit parameters via sampling of the observable objective function at quadrature points in the circuit parameters. Optimization is used to determine the optimal circuit parameters within the cluster, with the other circuit parameters frozen. In a second stage, different clusters of circuit parameters are then optimized in "Jacobi sweeps" leading to a monotonically convergent fixed-point procedure. In a third stage, the iterative history of the fixed-point Jacobi procedure may be used to accelerate the convergence by applying Anderson acceleration/Pulay's direct inversion of the iterative subspace.

The aforementioned patent application U.S. Pat. No. '638 teaches the optimization of discrete functions. It is, however, one of the challenges with variational quantum algorithms is the optimization of continuous functions with continuous variables. However, technical problems in science and engineering are often modelled using continuous function and there is therefore a need to find methods for optimising this function.

Another challenge in the optimisation of function is that the currently available quantum computers have a limited number of qubits that can be used for such optimisation. There is therefore a need to efficiently use the few-qubit quantum computers currently available.

SUMMARY OF THE INVENTION

To this end, the present invention teaches a method and system for optimization of multidimensional continuous functions using a quantum processor (or a quantum simulation) with n qubits. The method comprising initialising quantum circuit parameters to set an initial guess of a function. A variational quantum circuit is run over n qubits of the quantum processor and the implementing a quantum state tomography function is implemented for the individual qubits to estimate qubit parameters of the function for each qubit and then estimating a vector of a continuous variable from the qubit parameters followed by estimating a value of the function and a gradient of the function at the point of the vector of the continuous variable. The previous steps can be iterated until optimization of the function.

The method and system of the present invention improves the optimisation of the multidimensional continuous functions by enabling the initializing of quantum circuit parameters to set an initial guess of the multidimensional continuous function in the continuous domain. This avoids the need to apply a discretization to the multidimensional continuous functions. The implementation of the quantum state tomography enhances accuracy and speed of quantum computations with a small number of qubits compared to prior art discretized approaches for the optimization of the multidimensional continuous functions.

The use of the variational quantum circuit set out in this document allows to minimize the value of the function. A cost function for example can be used to determine the minimum of the function and this allows to solve complex mathematical calculations.

The variables of the function are encoded in the degrees of freedom of the individual qubits. There are three degrees of freedom available for each individual qubit in a mixed state and thus 3*n continuous variables can be optimized using the variational quantum circuit of n qubits. 2*n continuous variables can be optimized for each qubit pure state having two degrees of freedom.

The method and system set out in this document can be applied to a variety of mathematical calculations using the quantum computer. For example, the method and system can be used to find the minimum of the function and to solve complex mathematical problems.

Examples include, but are not limited to, differential equations, series expansions, evaluating integrals, Fourier analysis, Taylor series expansion, integro-differential equations, vector and tensor fields, and non-linear differential equations.

The implementation of the quantum state tomography function of the individual qubits comprises the estimation of the qubit parameters of the function for each mixed-state qubit p or the qubit parameters for each pure-state qubit.

The implementing of the quantum state tomography function of the individual qubits may further comprise the encoding of the continuous variables of the function to the qubit parameters. Combining the encoding of the continuous variables of the function to the qubit parameters with quantum state tomography allows the optimization of the function of 3*n continuous variables.

In one aspect, the quantum circuit parameters are updated using a gradient descent. he optimization of the function is finding the minimum of the function. The finding the minimum of the function enables to compute complex series expansions.

In one aspect, the method may comprise entangled qubit states as initial guess.

The present invention also teaches a system for optimization of multidimensional continuous functions. The system comprises a variational quantum circuit and a quantum processor. The quantum processor is configured to initialize quantum circuit parameters to set initial guess of a function and to run a variational quantum circuit over n qubits.

The quantum processor can implement a quantum state tomography function of the individual qubits to estimate qubit parameters of the function for each qubit and estimate a vector of variables from the qubit parameters and to estimate a value of the function and a gradient of the function at the point of the variable. The quantum circuit parameters are updated by the quantum processor and, as noted above, the quantum processor is configured to iterate the quantum circuit parameters until optimization of the function.

In one aspect, the variational quantum circuit of the system of the invention may be implemented as a quantum gate computer.

In one aspect, the quantum state tomography function encodes the continuous variables of the function to the qubit parameters.

In one aspect, the variational quantum circuit may optimize the function with 3n continuous variables for n qubit mixed states.

In one aspect, the variational quantum circuit may optimize the function by finding the minimum of the function.

Universal quantum computers based on a quantum circuit model can handle mathematical analysis calculations for functions with continuous domains. The present document describes a variational quantum circuit in which a qubit is able to encode up to three continuous variables. The three continuous variables are, for example, two angles and one radius in the Bloch sphere. The combination of qubit encoding with quantum state tomography enables the variational quantum circuit of n qubits to optimize functions of up to 3n continuous variables in an analog way.

A quantum algorithm for continuous optimization can be used to compute arbitrary series expansions such as but not limited to Fourier (harmonic) decompositions. It is known that Fourier analysis allows to implement a variety of tasks related to function calculus and thus the quantum algorithm can be used in, for example, the evaluation of multidimensional definite integrals, and solving systems of differential equations. Complex function calculation can solve different technical problems in science and engineering using quantum computers in a more efficient way than traditional classical methods.

This document teaches a quantum optimization algorithm for mathematical analysis on NISQ processors. A quantum computer of 433 qubits, such as, but not limited to, the IBM-Q System Two, can use the quantum optimization algorithm described in this application to analyse 381-dimensional functions directly in the continuum. A simulation of the quantum optimization algorithms with quantum computational software demonstrates that the method and apparatus set out in this document are able to conduct the mathematical analysis at a processing time comparable to standard classical computational software. It would be expected that running the quantum optimisation algorithm on a true quantum processor (rather than a quantum simulation) will substantially speed up the processing time.

In a discrete optimization problem, which is the usual case addressed by quantum computing, the variables used in the objective function are discrete variables. In the quantum optimization algorithm described in this document, the variables employed in the objective function are continuous. The continuous variables are used by continuous and differentiable function for example. Continuous quantum optimization enables to solve problems in mathematical science and engineering, for example, in design of biomolecules, in financial portfolio optimization, and fluid dynamics.

BRIEF DESCRIPTION OF THE FIGURES

For a more complete understanding of the present invention and the advantages thereof, reference is now made to the following description and the accompanying drawings, in which.

DETAILED DESCRIPTION OF THE INVENTION

The present invention will now be described on the basis of the drawings. It will be understood that the embodiments and aspects of the invention described herein are only examples and do not limit the protective scope of the claims in any way. The invention is defined by the claims and their equivalents. It will be understood that features of one aspect or embodiment of the invention can be combined with a feature of a different aspect or aspects and/or embodiments of the invention.

Figure 1:
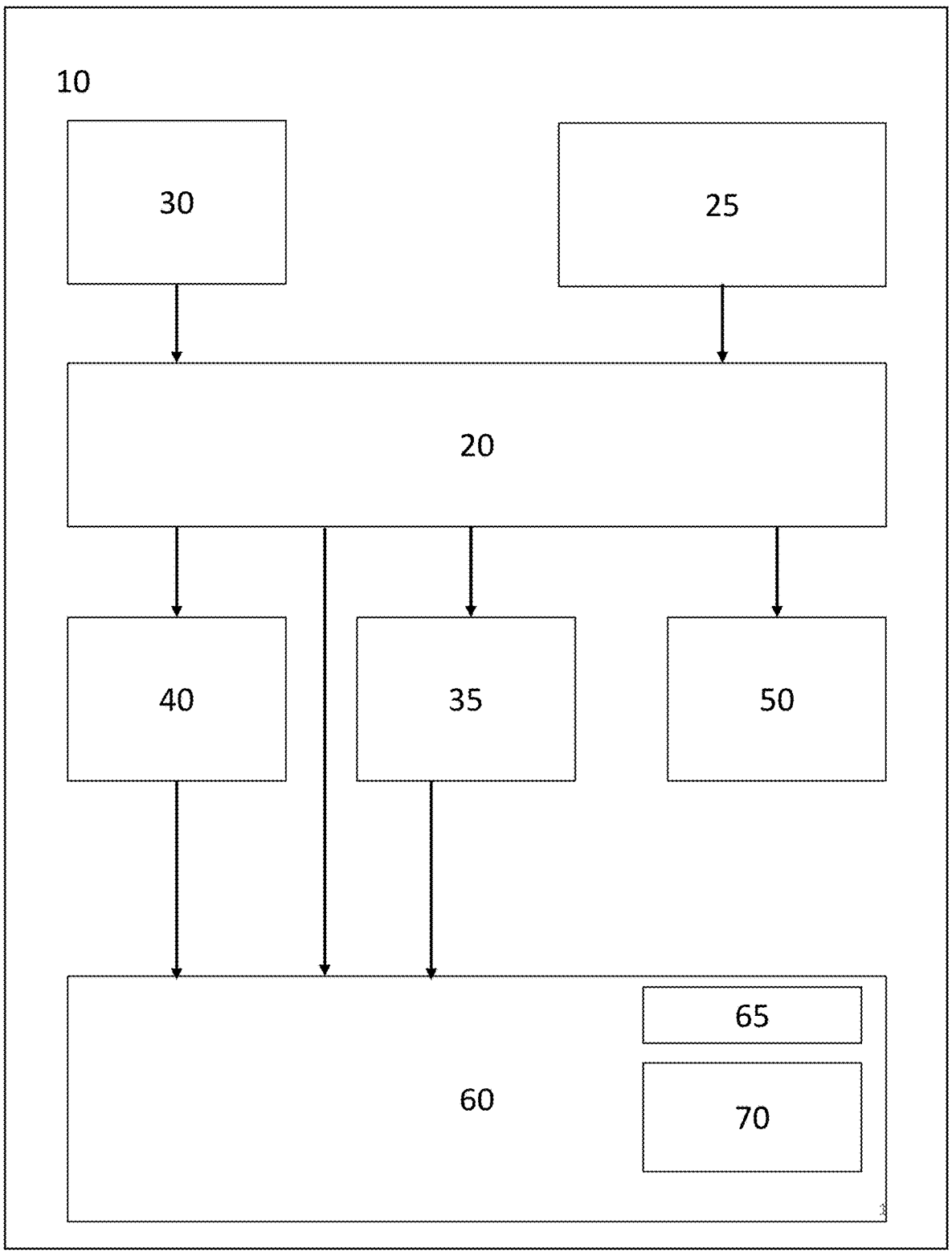
FIG. 1 shows an overview of a quantum computing system according to one aspect of the invention.

FIG. 1 shows an overview of a typical quantum computing for performing the method set out in this document. FIG. 1 shows an overview of a computing system 10 for implementing the method of this document. The computing system 10 is, for example, a hybrid quantum and classical system and comprises, in an example, a (classical) central processing unit 20 which is connected to a data storage unit 25 (i.e., one or more memory devices), and a plurality of input/output devices 30. The input/output devices 30 enable input of one or more functions and an output of optimized variables for the one or more of the functions.

A graphics processing unit 35 for processing variable optimization and a field programmable gate array (FGPA) 40 for control logic can also be connected to the central processing unit 20. A quantum processor 50 (also termed quantum accelerator) is connected to the central processing unit 20. In an alternative embodiment, the quantum processor 50 is emulated on a classical processor.

In one implementation of the computing system 10, the quantum processor 50 can be a quantum gate system, such as one supplied by IBM-Q System One, but this is not limiting of the invention. The computing system 10 is connected to a computer network 60, such as the Internet. It will be appreciated that the computing system 10 of FIG. 1 is merely exemplary and other units or elements may be present in the computing system 10. It will also be appreciated that there may be many input/output (I/O) devices 30 located at multiple locations and that there may be a plurality of data storage units 25 also located at multiple locations. The many I/O devices and data storage units 25 are connected by the computer network 60.

The computer network 60 is accessed by a large number of devices 70 which can include personal computers, smartphones and/or tablets, but not limited to.

Figure 2:
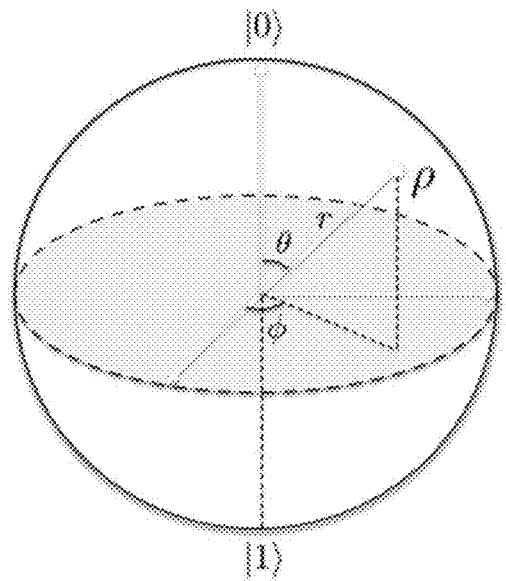
FIG. 2 shows a Bloch sphere of one qubit.

FIG. 2 shows a Bloch sphere of a qubit. A mixed-state p is a point of the interior of the Bloch sphere and is characterized by three continuous parameters [$\theta$, $\varphi$, r], also termed qubit parameters. Pure qubit states correspond to points on the surface of the Bloch sphere, so that radius r is equal to one, and depend on two angular variables ($\theta$, $\varphi$). The pure qubit states can be parametrized by the two angular variables ($\theta$, $\varphi$) which take values between 0 and $\pi$.

Two angular variables ($\theta$, $\varphi$) can be expressed mathematically as follows: $\theta \in [0, \pi]$ and $\varphi \in [0, 2\pi)$. The pure state $|\psi\rangle$ of the qubit is given by the formula:

$$|\psi\rangle = \cos\left(\frac{\theta}{2}\right)|0\rangle + e^{i\varphi}\sin\left(\frac{\theta}{2}\right)|1\rangle$$

with $\{|0\rangle, |1\rangle\}$ being the orthogonal computational basis of the Hilbert space.

Similarly, the mixed states p of the qubit corresponds to points in the interior of the Bloch sphere of FIG. 2. These mixed states p of the qubit correspond to the single-qubit configurations in which the qubit is entangled with some other quantum system. In this case, a reduced density matrix of the qubit is no longer a pure state.

Mathematically, the mixed state p of the qubit is written as follows:

$$\rho = \frac{1}{2}(I + \vec{n} \cdot \vec{\sigma}),$$

where I is a 2×2 identity matrix, $n=(n_x, n_y, n_z)$ is a three-dimensional vector of real components and $\vec{\sigma}=(\sigma_x, \sigma_y, \sigma_z)$ is a three-dimensional vector of three Pauli matrices $\sigma_x$, $\sigma_y$, $\sigma_z$. In this notation, the qubit is in the pure state (e.g., on the surface of the Bloch sphere) if $|\vec{n}|=1$, where the vector is given by $\vec{n}=r*(\sin\theta\cos\varphi, \sin\theta\sin\varphi, \cos\theta)$ in spherical coordinates, so that the mixed state $\rho$ is expressed by: $\rho=|\psi\rangle\langle\psi|$. The qubit is in the mixed state $\rho$ when $|\vec{n}|<1$, so that $\vec{n}=r*(\sin\theta\cos\varphi, \sin\theta\sin\varphi, \cos\theta)$, with $r<1$ being the radial coordinate of a point inside the Bloch sphere.

The way to encode continuous variables in the degrees of freedom of the quantum computer 50 will be explained herein.

Mathematically, the problem can be expressed as follows. Let that $f(\vec{x})$ denote a real scalar function of m real continuous variables $\vec{x}=(x_1, x_2, \ldots, x_m)$. The domain of each continuous variable $x_a$ is $D_a \subseteq \mathbb{R}$ for all $a=1, 2, \ldots, m$. All the derivations can be directly translated to more complex scenarios, as, for example, real and complex vector and tensor fields and complex variables.

The statement of the problem is to find the minimum of the function $$f(\vec{x}) : \min_{\vec{x}} f(\vec{x}).$$

Figure 3:
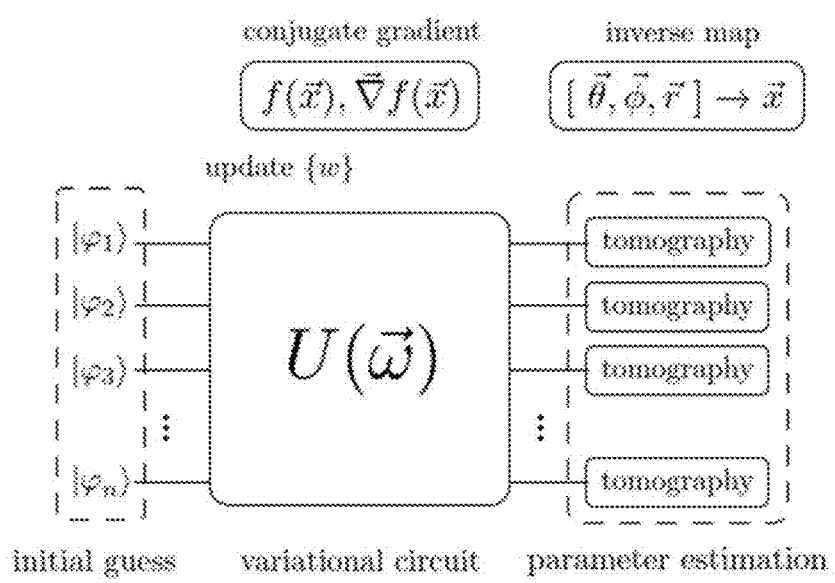
FIG. 3 shows a variational continuous quantum optimization algorithm.

To codify the continuous variable $(x_\alpha, x_\beta, x_y)$ of the function $f(\vec{x})$, the continuous variables $(x_\alpha, x_\beta, x_y)$ are used in the encoding as set out above with reference to FIG. 3. In this way, for the general qubit mixed state $\rho$, three continuous variables $(x_\alpha, x_\beta, x_y)$, for example, can be encoded, as follows:

[$x_\alpha$, $x_\beta$, $x_y$] are enclosed as [$\theta$, $\phi$, r],
$D_\alpha \in [0, \pi]$, $D_\beta \in (0, 2\pi]$, $D_y \in [0, 1)$ The continuous function variables $(x_\alpha, x_\beta, x_y)$ are mapped to the continuous qubit parameters [$\theta$, $\varphi$, r] with a corresponding embedding of the continuous domains $D_\alpha$, $D_\beta$, $D_y$. In this way, up to three continuous variables $(x_\alpha, x_\beta, x_y)$ per the mixed-state qubit p can be encoded. Similarly, if the qubit is in the pure state, the radius r=1 and up to two continuous variables per pure-state qubit can be encoded.

Optimization Algorithm. FIG. 3 shows the variational continuous quantum optimization algorithm. The problem of the variational continuous optimization can be solved using the quantum processor 50 in combination with the continuous variable encoding set out above. A variational quantum circuit $U(\vec{\omega})$ is used to minimize the function $f(\vec{x})$, following the procedure of a variational quantum eigensolver (VQE) but with different embedding of the continuous variables $(x_\alpha, x_\beta, x_y)$.

The encoding of the continuous variables $(x_\alpha, x_\beta, x_y)$ of the function $f(\vec{x})$ occurs in the degrees of freedom of the individual qubits. The variational quantum circuit $U(\vec{\omega})$ of the n qubits can be used to optimize the function $f(\vec{x})$ of up to m=3n continuous variables $(x_\alpha, x_\beta, x_y)$ for the mixed qubit states $\rho$. Similarly, the functions $f(\vec{x})$ can be optimized up to 2n variables for the pure qubit states.

The variational quantum circuit $U(\vec{\omega})$ with a set of variational circuit parameters $\vec{\omega}$ also termed quantum circuit parameters $\vec{\omega}$. The idea is to estimate the qubit parameters [$\vec{\theta}$, $\vec{\varphi}$, $\vec{r}$] for all of the qubits via single-qubit tomography function and therefore to obtain the value of the continuous function variables $\vec{x}$. Quantum tomography function or quantum state tomography is the process by which a quantum state is reconstructed using measurements on an ensemble of identical quantum states.

The source of these states may be any device or system which prepares quantum states either consistently into quantum pure states or otherwise into general mixed states. When the function $f(\vec{x})$ and function's gradient $\vec{\nabla}f(\vec{x})$ are estimated, the quantum circuit parameters $\vec{\omega}$ can be updated via, for example, a conjugate gradient.

Figure 4:
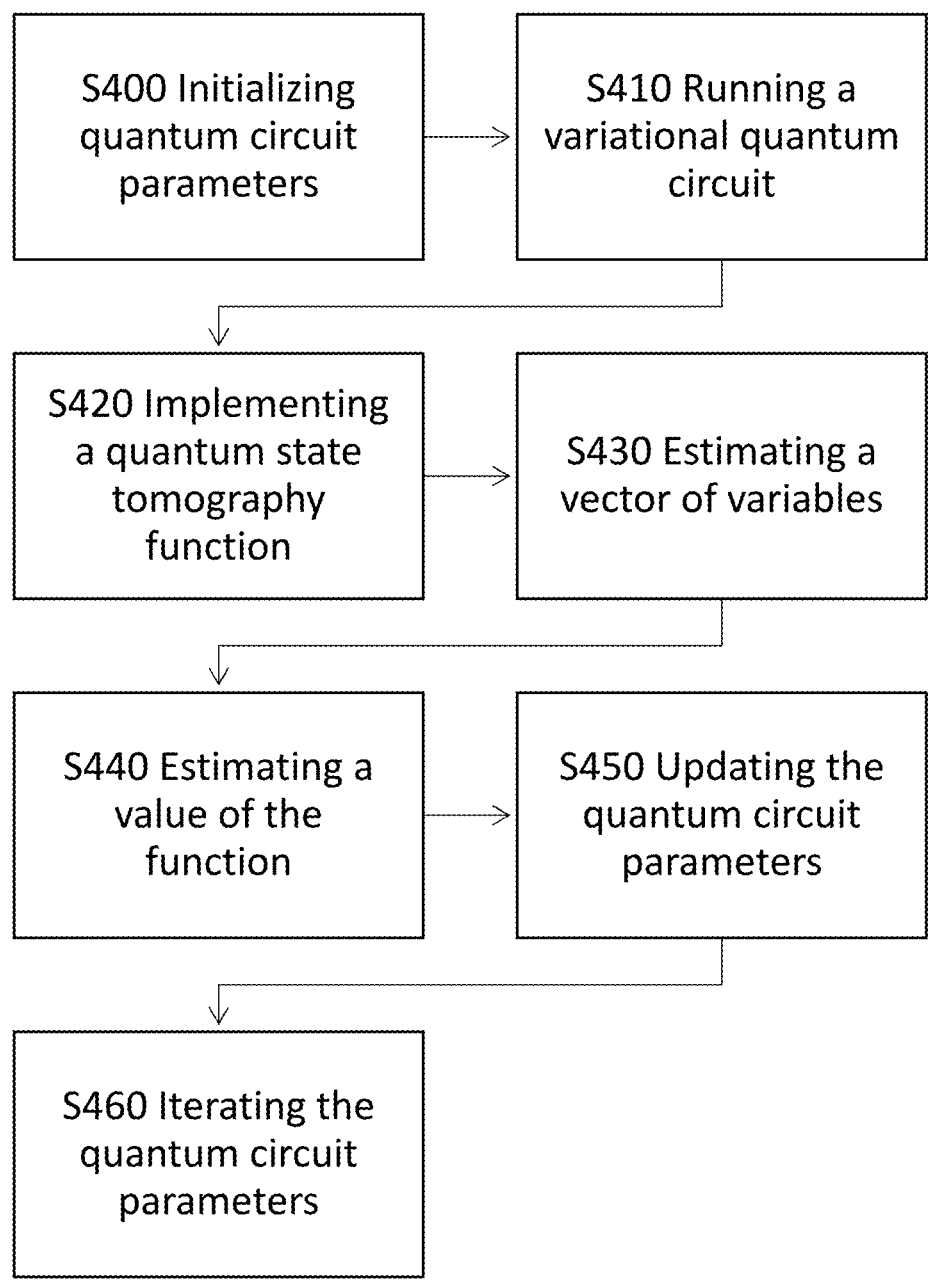
FIG. 4 shows a method of the variational continuous optimization.

The method of the variational continuous optimization is outlined in FIG. 4 and will now be explained. The method starts in step S400. The quantum circuit parameters $\vec{\omega}$ are initialised to set an initial guess ($|\psi_1\rangle, |\psi_2\rangle, |\psi_3\rangle, \ldots, |\psi_n\rangle$) of the function $f(\vec{x})$. The initial guess $|\psi\rangle$ can be chosen using prior knowledge or at random as explained below.

In step S410, the variational quantum circuit $U(\vec{\omega})$ is run over the n qubits.

In step S420, the quantum state tomography function of the individual qubits is implemented to estimate the qubit parameters [$\theta$, $\varphi$, r] of the function $f(\vec{x})$ for the each of the mixed-state qubits $\rho$. In one non-limiting example, the quantum state tomography function is also implemented to estimate the qubit parameters [$\theta$, $\varphi$] of the function $f(\vec{x})$ for each pure state qubit.

The quantum state tomography used in step S420 can be one of a single-qubit quantum state tomography or a multi-qubit quantum state tomography.

An example will illustrate this point. Let us suppose that there is an entangled state of N qubits, and this will enable representation of $2*2^{N-1}$ real continuous variables $(x_\alpha, x_\beta, x_y)$ for the entangled state of N qubits. In other words, the number of continuous variables which can be encoded depends on the number N of qubits available in the system.

The continuous variables $(x_\alpha, x_\beta, x_y)$ are then encoded to the qubit parameters [$\theta$, $\varphi$, r] in step S420 as explained below. This multi-qubit quantum state tomography improves representation power. However, it will be appreciated that the representation power will be more complex to read out the qubit parameters [$\theta$, $\varphi$, r] from the N qubits using the multiqubit quantum state tomography, as the read-out will involve making measurements acting simultaneously on the N qubits.

Step S420 may further comprise the encoding of the continuous variables ($x_\alpha$, $x_\beta$, $x_\gamma$) to the qubit parameters [$\theta$, $\varphi$, r] of the mixed state qubits $\rho$. This means that the quantum state produced by the variational quantum circuit $U(\vec{\omega})$ is a multi-qubit entangled state, whereas the encoding in the pure state qubits produces a separable non-entangled state.

In step S430, a vector of variables $\vec{x}$ is estimated from the qubit parameters [$\theta$, $\varphi$, r].

In step S440, a value of the function $f(\vec{x})$ and the function's gradient $\vec{\nabla} f(\vec{x})$ are estimated at the point of the variable $\vec{x}$.

In step S450, the quantum circuit parameters $\vec{\omega}$ are updated. The quantum circuit parameters $\vec{\omega}$ are updated using gradient descent $\vec{\nabla} f(\vec{x})$ method, for example, although this is not limiting of the invention and gradient-free methods can be used for the quantum circuit parameters $\vec{\omega}$ update.

In step S460, the previous steps from S410 to S450 are iterated until optimization of the function $f(\vec{x})$. In a non-limiting example of the invention, the optimization of the function $f(\vec{x})$ comprises finding the minimum of the function $f(\vec{x})$.

The idea of the method set out in this document is to encode the continuous function variables ($x_\alpha$, $x_\beta$, $x_\gamma$) into the qubit parameters [$\theta$, $\varphi$, r] and determine these qubit parameters via the single-qubit quantum state tomography. The continuous function variables ($x_\alpha$, $x_\beta$, $x_\gamma$), i.e., continuous states of individual qubits, are determined in the method described in this document without relying on a discrete set of individual qubit states.

The initial guess $|\psi\rangle$ in step S400 can be chosen from either entangled states or product states. For example, an educated tensor network (TN) can be efficiently prepared on the quantum processor 50 (as a matrix product state) to generate the initial guess $|\psi\rangle$.

In one non-limiting example, the educated tensor network can be run using a classical tensor network simulation algorithm. The resulting matrix product state obtained from the classical tensor network simulation algorithm can be used as the initial guess $|\psi\rangle$ of the quantum computer 50. In another aspect, a random product state can also be used as the initial guess $|\psi\rangle$ of the quantum computer 50 in step S400.

The variational quantum circuit $U(\vec{\omega})$ subsequently adds or removes entanglement on top of the quantum processor 50. Such initial TN state could be, the outcome, or even an intermediate-step state, of a TN optimization algorithm.

Applications. The method and the system described in this document can be used to solve a variety of problems in mathematical analysis using the quantum processor 50.

Series expansions. A series expansion is an expansion of a function into a series or infinite sum. In science and engineering, the series expansions are a way to express and approximate the functions via truncation of the series, allowing to compute and approximate further, more complex calculations. An example of the series expansion are Fourier series in mathematics and engineering, as well as Taylor expansions.

Suppose that $f(\vec{x})$ is a scalar function of m real variables, $x_\alpha \in \mathbb{R}$ for $\alpha=1, 2, \ldots, m$. A generic series expansion is given by $$f(\vec{x}) = \sum_{l=0}^{\infty} c_l g_l(\vec{x}),$$

where the functions $g_l(\hat{x})$ are an orthogonal basis of the vector space of the functions in the domain D of variable $\vec{x}$ with respect to a weight function $w(\vec{x})$, e.g., $$\langle g_l, g'_l \rangle = \int_D w(\vec{x}) g^*_l(\vec{x}) g_{l'}(\vec{x}) d\vec{x} = \delta_{ll'}.$$

and coefficients $c_l$ are given by the scalar product $$c_l = \int_D w(\vec{w}) g^*_l(\vec{x}) f(\vec{x}) d\vec{x}$$

Approximations to the function $f(\vec{x})$ can be implemented by truncating the series expansion with following function:

$$f(\vec{x}) \approx \sum_{l=0}^{K-1} c_l g_l(\vec{x}),$$

Keeping the first K terms in the series, and where the error is usually quantified with upper bounds. A more refined approximation to this function is computation of the optimal coefficients when involving only K terms in the expansion. This is the solution to the optimization problem $$\min_{\vec{c}} \left( \int_D w(\vec{x}) |f(\vec{x}) - \sum_{l=0}^{K-1} c_l g_l(\vec{x})|^2 d\vec{x} \right)^{1/2}$$

where the quadratic distance is minimized with respect to the product $\langle g_l, g_{l'} \rangle$ as described before. $\vec{x} \equiv (c_0, c_1, \ldots, c_{K-1})$ is then defined as a vector of coefficients.

Given that computing the above integral may cumbersome, an approximation with good accuracy can be applied by discretising the integral using a Riemann sum $$\min_{\vec{c}} \left( \sum_\mu^M w(\vec{x}_\mu) |f(\vec{x}_\mu) - \sum_{l=0}^{K-1} c_l g_l(\vec{x}_\mu)|^2 \Delta \vec{x}_\mu \right)^{1/2}$$

where $\vec{x}_\mu$ are M points in the domain D. The solution to this problem is equivalent to optimization of the squared distance:

$$\min_{\vec{c}} \left( \sum_\mu^M w(\vec{x}_\mu) |f(\vec{x}_\mu) - \sum_{l=0}^{K-1} c_l g_l(\vec{x}_\mu)|^2 \Delta \vec{x}_\mu \right)$$

This equation directly solves the optimization problem. The coefficients $c_l$ of an optimal truncated expansion are then better computed directly by solving the corresponding optimization problem for the coefficients $c_i$. The coefficients $c_i$ can be computed straightforwardly using the quantum optimization algorithm described by the present document.

Fourier analysis. The Fourier analysis is a particular example of the series expansions described above. For example, a one-variable function of period 2L will be defined by the expression:

$$f(x) = \sum_{l=-\infty}^{\infty} c_l e^{i2\pi lx/L} \approx \sum_{l=-K/2}^{K/2} c_l e^{i2\pi lx/L}$$

The last approximation involves a total of K Fourier modes. If the function is not periodic, then 2L is the size of the domain D for which the expansion is to be found. Similarly, the Fourier expansion can be expressed in terms of trigonometric function:

$$f(x) \approx a_0 + \sum_{l=1}^{K-1}\left(a_l \cos\left(\frac{\pi l x}{L}\right) + b_l \sin(\pi l x/L)\right)$$

Following the method set out previously, the coefficients $c_l$, $a_l$ and $b_l$ can be found by solving the continuous optimization problem. This can be done using the continuous quantum optimization algorithm described herein, allowing then to implement Fourier analysis directly in an analog way on the quantum processor 50. This procedure can be extended to multidimensional functions following same instructions.

Integrals. The calculation of complicated integrals can be implemented using Fourier analysis. Let I(a, b) be the integral to be computed:

$$I(a,b) = \int_a^b f(x)dx \approx \sum_{l=-K/2}^{K/2} c_l \int_a^b e^{\frac{i2\pi lx}{(b-a)}} = \sum_{l=-K/2}^{K/2} \frac{ic_l(b-a)}{2\pi l} = \left(e^{\frac{i2\pi la}{b-a}} - e^{\frac{i2\pi lb}{b-a}}\right)$$

This is formula that can be used for approximating the integral when the coefficients $c_l$ are known.

Differential equations and systems. Transforms and series expansion are one of ways to solve differential equations, as well as systems of such types of equations. For the case of the linear differential equation:

$$a_0(x)f(x) + a_1(x)f'(x) + \ldots + a_n(x)f^n(x) = b(x)$$

where $a_0(x), \ldots, a_n(x)$ and $b(x)$ are some functions and $f'(x), \ldots, f^n(x)$ are the derivatives of the function $f$ with respect to the variable x. The solution to this problem is one that minimizes the functional $$F[f(x)] \approx \left(\sum_{l=-\frac{K}{2}}^{\frac{K}{2}} \sum_{a=0}^{n} a_a(x)\left(\frac{i2\pi l}{L}\right)^a c_l e^{\frac{i2\pi lx}{L}} - b(x)\right)^2$$

for every point x. The differential equation can then be solved by further expanding $a_0(x), \ldots, a_n(x)$ and $b(x)$ into Fourier series. After aggregating all exponential terms in the resulting sum, it the form: results in an expansion of $$F[f(x)] \approx \sum_{l=-\frac{K}{2}}^{\frac{K}{2}} g_l(\vec{c})e^{\frac{i2\pi lx_\mu}{L}}$$

with $g_l(\vec{c})$ are known function of coefficients ĉ arranged in vector notation. Because of the orthogonality of exponentials, minimizing the above approximated functional over ĉ amounts to solve the set of minimization problems $$\min_{\vec{c}} g_l(\vec{c}) \forall\, l$$

with the constraints corresponding to boundary conditions as Lagrange multipliers.

As a solution of the above set of minimizations an approximated solution to the original differential equation is obtained in the form of a Fourier expansion. This procedure can be generalized to more complicated situations, such as multidimensional functions with partial differential equations, vector, and tensor fields, non-linear differential equations, systems of partial differential equations, integro-differential equations, and more.

The method of the present invention as described above allows one to solve a variety of technical problems in science and engineering more efficiently than with classical resources, using few-qubit quantum computers that are presently available. Non-limiting examples are computational fluid dynamics, system simulation, optimal control of machines in factories and predictive maintenance. Navier Stokes equations, Maxwell equations for electromagnetic fields, Lagrange equations for calculation of forces in structures are further non limiting examples of the solutions of technical problems provided by the described method and apparatus. Further non-limiting example is the optimization of the control of factories based on functions that depend on continuous parameters such as, for example, angles, speeds, forces or temperatures.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto and their equivalents. The entirety of each of the aforementioned documents is incorporated by reference herein.

Reference Numerals

10—Computing system
20—Central processing unit
25—Data storage
30—Input/output devices
35—Graphics processing unit
40—Field programmable gate array
50—Quantum processor
55—Input devices
60—Computer network $x_\alpha, x_\beta, x_\gamma$—continuous variables
$\theta, \varphi, r$—qubit parameters
$r$—radius
$\theta, \varphi$—angular variables
$U(\vec{\omega})$—variational quantum circuit
$f(\vec{x})$—function
$p$—mixed qubit state
$\vec{\omega}$—quantum circuit parameters
$\vec{\nabla} f(\vec{x})$—gradient descent
$|\psi\rangle$—initial guess
$w(\vec{x})$—weight function
$c_I$—coefficients
$D$—domain of variables

What is claimed is:

1. A method for optimization of multidimensional continuous functions using a quantum processor comprising:

initializing quantum circuit parameters $(\vec{\omega})$ to set an initial guess $|\psi\rangle$ of a function $f(\vec{x})$:

running a variational quantum circuit $U(\vec{\omega})$ over n qubits of the quantum processor:

implementing a quantum state tomography function of the individual qubits to estimate qubit parameters $[\theta, \varphi, r]$ of the function $f$ for each qubit:

estimating a vector of a continuous variable $(\vec{x})$ from the qubit parameters $[\theta, \varphi, r]$;

estimating a value of the function $f(\vec{x})$ and a gradient $\vec{\nabla} f(\vec{x})$ of the function $f(\vec{x})$ at the point of the vector of the continuous variable $(\vec{x})$;

updating the quantum circuit parameters $(\vec{\omega})$; and iterating the steps until optimization of the function $f(\vec{x})$.

2. The method of claim 1, wherein implementing of the quantum state tomography function of the individual qubits comprises estimation of the qubit parameters $[\theta, \varphi, r]$ of the function $f$ for each mixed-state qubit $p$ or the qubit parameters $[\theta, \varphi]$ for each pure-state qubit.

3. The method of claim 1, wherein estimating a vector of variables $(\vec{x})$ from the qubit parameters $[\theta, \varphi, r]$ comprises optimization of the function $f(\vec{x})$ with 3n continuous variables $(x_\alpha, x_\beta, x_\gamma)$ for n qubit mixed states.

4. The method of claim 1, wherein implementing of the quantum state tomography function of the individual qubits comprises encoding continuous variables $(x_\alpha, x_\beta, x_\gamma)$ of the function $f(\vec{x})$ to the qubit parameters $[\theta, \varphi, r]$.

5. The method of claim 1, wherein the quantum circuit parameters $(\vec{\omega})$ are updated using gradient descent $\vec{\nabla} f(\vec{x})$.

6. The method of claim 1, wherein the optimization of the function $f(\vec{x})$ is finding the minimum of the function $f(\vec{x})$.

7. The method of claim 1, wherein the function $f(\vec{x})$ is one of Fourier series, Taylor series expansion, integro-differential equations, vector, and tensor fields, and non-linear differential equations.

8. The method of claim 1, wherein the initializing quantum circuit parameters $(\vec{\omega})$ to set initial guess $|\psi\rangle$ comprises entangled states as initial guess $|\psi\rangle$.

9. A system for optimization of multidimensional continuous functions, comprising:

a variational quantum circuit $U(\vec{\omega})$; and
a quantum processor,
wherein the quantum processor is configured to:

initialize quantum circuit parameters $(\vec{\omega})$ to set an initial guess $|\psi\rangle$ of a function $f(\vec{x})$;

run the variational quantum circuit $U(\vec{\omega})$ over n qubits:

implement a quantum state tomography function of the individual qubits to estimate qubit parameters $[\theta, \varphi, r]$ of the function $f(\vec{x})$ for each qubit:

estimate a vector of a continuous variable $(x)$ from the qubit parameters $[\theta, \varphi, r]$;

estimate a value of the function $f(\vec{x})$ and a gradient $\vec{\nabla} f(\vec{x})$ of the function $f(\vec{x})$ at the point of the variable $(x)$;

update the quantum circuit parameters $(\vec{\omega})$; and iterate the steps until optimization of the function $f(\vec{x})$.

10. The system of claim 9, comprising a plurality of input/output devices for inputting said function $f(\vec{x})$ and outputting an output of continuous variables $(x_\alpha, x_\beta, x_\gamma)$ for the function $f(\vec{x})$.

11. The system of claim 9, comprising a central processing unit connected to a data storage unit, and to said plurality of input/output devices for input of the function $f(\vec{x})$ and an output of the continuous variables $(x_\alpha, x_\beta, x_\gamma)$ for the function $f(\vec{x})$.

12. The system of claim 9, wherein the variational quantum circuit $U(\vec{\omega})$ is implemented as a quantum gate computer.

13. The system of claim 9, wherein the quantum processor is configured to implement the quantum state tomography function which encodes the continuous variables $(x_\alpha, x_\beta, x_\gamma)$ of the function $f(\vec{x})$ to the qubit parameters $[\theta, \varphi, r]$.

14. The system of claim 9, wherein the variational quantum circuit $U(\vec{\omega})$ optimizes the function $f(\vec{x})$ with 3n continuous variables $(x_\alpha, x_\beta, x_\gamma)$ for n qubit mixed states.

15. The system of claim 9, wherein the variational quantum circuit $U(\vec{\omega})$ optimizes the function $f(\vec{x})$ by finding the minimum of the function $f(\vec{x})$.

* * * * *